(12) United States Patent
Hirahata et al.

(10) Patent No.: US 6,894,130 B2
(45) Date of Patent: May 17, 2005

(54) CATALYST FOR ADDITION POLYMERIZATION, AND PROCESS FOR PRODUCING ADDITION POLYMER WITH THE SAME

(75) Inventors: Wataru Hirahata, Chiba (JP); Yoshinori Seki, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 852 days.

(21) Appl. No.: 09/741,889

(22) Filed: Dec. 22, 2000

(65) Prior Publication Data

US 2001/0006931 A1 Jul. 5, 2001

(30) Foreign Application Priority Data

Dec. 27, 1999 (JP) ......................................... H11-370664
Dec. 27, 1999 (JP) ......................................... H11-370676

(51) Int. Cl.$^7$ ................................................. C08F 4/12
(52) U.S. Cl. ....................... 526/127; 526/133; 526/134; 502/439
(58) Field of Search ................................ 526/127, 133, 526/134; 502/439

(56) References Cited

U.S. PATENT DOCUMENTS

| | | | |
|---|---|---|---|
| 4,049,896 A | | 9/1977 | Rekers et al. |
| 4,085,070 A | | 4/1978 | Columberg |
| 4,415,712 A | | 11/1983 | Shipley et al. |
| 4,699,962 A | | 10/1987 | Hsieh et al. |
| 5,330,947 A | | 7/1994 | Shamshoum et al. |
| 5,763,547 A | | 6/1998 | Kolthammer et al. |
| 5,777,120 A | | 7/1998 | Jordan et al. |
| 5,973,088 A | | 10/1999 | Jordan et al. |
| 6,548,443 B1 | * | 4/2003 | Watanabe .................. 502/155 |

FOREIGN PATENT DOCUMENTS

| | | |
|---|---|---|
| EP | 0513380 A | 11/1991 |
| EP | 0572034 A | 5/1993 |
| EP | 0591756 A | 9/1993 |
| GB | 851119 | 10/1960 |
| GB | 905097 | 9/1962 |
| GB | 2048284 A | 4/1980 |
| WO | 9623005 | 8/1996 |
| WO | 9840421 | 9/1998 |
| WO | 0020466 | 4/2000 |
| WO | WO 00/20466 | * 4/2000 |
| WO | WO 00/62928 | * 10/2000 |
| WO | 0062928 | 10/2000 |

OTHER PUBLICATIONS

Macromol. Chem. 193, 1283–1288 (1992): "High–molecular–weight polyethylene: growth reactions at bis(dichloroaluminium)ethane and trialkylauminium" .

Polymer Preprints, Japan vol. 47, No. 8 (1998) with English language translation.

Polymer Preprints, Japan vol. 46, No. 7 (1997) with English language translation.

J.Am.Chem.Soc. 1997, 19, 8125–8126, Cationic Aluminium Alkyl Complexes Incorporating Amidiante Ligands. Transition–Metal–Free Ethylene Polymerization Catalyst, Martyn P. Coles and Richard F. Jordan.

J.Am.Chem.Soc. 1998, 120, 8277–8278, "Cationic Aluminum Alkyl Complexes Incorporating Aminotroponiminate Ligands"; Eiji Ihara et al.

J.Am.Chem.Soc. 2000, 122, 5668–5669, "Novel Aluminum–Based, Transition Metal–Free, Catalytic Systems for Homo– and Copolymerization of Alkenes" Jang Sub Kim et al.

Chem. Commun., 1998, 2523–2524; "Cationic alkyl aluminium ethylene polymerization catalysts based on monoanionic N,N,N–pyridyliminoamide ligands" Michael Bruce, et al.

ACS Polymer Preprints, 39(2), 1998, 510, "The Polymerization of Ethylene and Higher Olefins Using Transition Metal–Free Aluminum Based Catalyst Systems"; Louis M. Wojcinski II et al.

\* cited by examiner

*Primary Examiner*—Robert D. Harlan
(74) *Attorney, Agent, or Firm*—Stevens, Davis, Miller & Mosher, L.L.P.

(57) ABSTRACT

A catalyst for addition polymerization obtained by contacting (A) an organoaluminum compound, (B) a specific boron compound and (C) a solid inorganic compound, and a process for producing an addition polymer characterized by polymerizing an addition-polymerizable monomer in the presence of the catalyst.

10 Claims, No Drawings

CATALYST FOR ADDITION POLYMERIZATION, AND PROCESS FOR PRODUCING ADDITION POLYMER WITH THE SAME

BACKGROUND OF THE INVENTION

1. Field of the Invention

The present invention relates to a catalyst for addition polymerization, and a process for producing an addition polymer with the same.

2. Description of Related Arts

There has been well known a processes of polymerizing an addition-polymerizable monomer with a catalyst system obtained by contacting a metallocene-based and non-metallocene-based transition metal complex as a catalyst precursor with an activator (co-catalyst) such as an organoaluminum compound or the like. However, the synthesis of a transition metal complex as the catalyst precursor is difficult and expensive. Therefore, it would be desirable to provide a catalyst system which is economically and easily synthesized.

It is known that a polyethylene is obtained by contacting ethylene with an alkylaluminum which has been used as a co-catalyst in "Angew. Chem. Vol. 64, pp323(1952)" and "Makromol. Chem. Vol.193, pp1283(1992)". The polymerizations of ethylene and/or propylene by a catalyst system combining an alkylaluminum and a specified boron compound have been recently reported in "ACS Polymer Preprints, Vol.39, No.2, pp510(1998)".

Further, the polymerizations of ethylene with a catalyst system combining an aluminum complex having an amidinate ligand or a pyridinodiimine ligand and a specified boron compound have been disclosed in "J. Am. Chem. Soc. Vol.119, pp8125(1997)", "J. Am. Chem. Soc. Vol.120, pp8277(1998)", "Chem. Commun. pp2523(1998)", WO98/40421, U.S. Pat. Nos. 5,777,120 and 5,973,088.

A stereo-regular polymerization process of an addition-polymerizable monomer, for example, an α-olefin such as propylene or the like with a catalyst in which an organoaluminum compound is supported on a carrier, is also known. Examples of such as catalyst hav been disclosed in JP-A-52-2890 as an example of being supported on a metal acetate, and "Polymer Preprints, Japan, Vol.46, pp216 (1997)" and "Polymer Preprints, Japan, Vol.46, pp1215 (1997)" as an example of being supported on a metal chloride. However, these catalysts for addition polymerization have been not always satisfied from the viewpoint of catalyst activity.

SUMMARY OF THE INVENTION

An object of the present invention is to provide a highly active catalyst for addition polymerization which does not use a metallocene-based and non-metallocene-based transition metal complex as a catalyst precursor, and an efficient process for producing an addition polymer.

Namely, the present invention relates to a catalyst for addition polymerization obtained by contacting (A), (B) and (C) described below, and a process for producing an addition polymer characterized by polymerizing an addition-polymerizable monomer in the presence of the catalyst:

(A) an organoaluminum compound,
(B) one or more of boron compounds selected from (B1) to (B3) below;
   (B1) a boron compound represented by the general formula $BQ^1Q^2Q^3$,
   (B2) a boron compound represented by the general formula $G^+(BQ^1Q^2Q^3Q^4)^-$, and
   (B3) a boron compound represented by the general formula $(L-H)^+(BQ^1Q^2Q^3Q^4)^-$.
(wherein each of $Q^1$, $Q^2$, $Q^3$ and $Q^4$ is a halogen atom, a hydrocarbon group, a halogenated hydrocarbon group, a heterocyclic group, a substituted silyl group, an alkoxy group, or a di-substituted amino group, and they may be the same or different. $G^+$ is an inorganic, organic or organometallic cation; L is a neutral Lewis base, and $(L-H)^+$ is a Brønsted acid.), and
(C) a solid inorganic compound.

DETAILED DESCRIPTION OF THE INVENTION

The present invention is illustrated in detail below.

(A) Organoaluminum Compound

The organoaluminum compound used in the present invention is an aluminum compound having an Al—C bond. Various such as aluminum compounds can be used, and one or more of aluminum compounds selected from (A1) to (A4) described below are preferable:

(A1) An organoaluminum compound represented by the general formula; $R_rAl(OR)_oH_pX^1_q$, (A2) an organoaluminum compound represented by the general formula; $M^1AlR_4$, (A3) a cyclic aluminoxane having a structure represented by the general formula; $\{-Al(R)-O-\}_j$, and (A4) an aluminoxane having a structure represented by the general formula; $R\{-Al(R)-O-\}_k AlR_2$.

(wherein each of R's independently represents a hydrocarbon group having 1 to 20 carbon atoms; each of $X^1$'s independently represents a halogen atom; $M^1$ represents an alkaline metal atom; "r" represents a numeral satisfying $0<r\leq3$; "o" represents a numeral satisfying $0\leq o<3$; "p" represents a numeral satisfying $0\leq p<3$; "q" represents a numeral satisfying $0\leq q<3$; r+o+p+q=3; "j" represents an integer of 2 or more; and "k" represents an integer of 1 or more.)

As the organoaluminum compound (A1), the following compounds and the like can be exemplified.

① An organoaluminum compound represented by the general formula; $R_rAl(OR)_{3-r}$ (wherein each of R's independently represents a hydrocarbon group having 1 to 20 carbon atoms, preferably 1 to 15 carbon atoms, and more preferably 1 to 8 carbon atoms. "r" represents a numeral satisfying $0<r\leq3$, and preferably $1\leq r\leq3$.)

② An organoaluminum compound represented by the general formula; $R_rAlX^1_{3-r}$ (wherein each of R's independently represents a hydrocarbon group having 1 to 20 carbon atoms, preferably 1 to 15 carbon atoms, and more preferably 1 to 8 carbon atoms, and each of $X^1$'s independently represents a halogen atom. "r" represents a numeral satisfying $0<r\leq3$, and preferably $0<r<3$.)

③ An organoaluminum compound represented by the general formula; $R_rAlH_{3-r}$ (wherein each of R's independently represents a hydrocarbon group having 1 to 20 carbon atoms, preferably 1 to 15 carbon atoms, and more preferably 1 to 8 carbon atoms. "r" represents a numeral satisfying $0<r\leq3$, and preferably $2\leq r<3$.)

④ An organoaluminum compound represented by the general formula; $R_rAl(OR)_oX^1_q$,
(wherein each of R's independently represents a hydrocarbon group having 1 to 20 carbon atoms, preferably 1 to 15 carbon atoms, and more preferably 1 to 8 carbon atoms, and each of $X^1$'s independently represents a halogen atom. "r" represents a numeral satisfying $0<r\leq 3$, "o" represents a numeral satisfying $0\leq o<3$, "q" represents a numeral satisfying $0\leq q<3$, and r+o+q=3.

Each of R's in the general formula representing the above-mentioned organoaluminum compounds ① to ④ is independently an alkyl group or an aryl group, and each of $X^1$'s is independently a chlorine atom or a bromine atom.

Specific examples of the organoaluminum compound of the fore-mentioned ① include tri-n-alkylaluminums such as trimethylaluminum, triethylaluminum, tri-n-butylaluminum, tri-n-hexylaluminum, tri-n-octylaluminum and the like; tri branched-alkyl aluminums such as triisopropylaluminum, triisobutylaluminum, tri-sec-butylaluminum, tri-tert-butylaluminum, tri-2-methylbutylaluminum, tri-3-methylbutylaluminum, tri-3-methylpentylaluminum, tri-4-methylpentylaluminum, tri-2-methylhexylaluminum, tri-3-methylhexylaluminum, tri-2-ethylhexylaluminum and the like; tricycloalkylaluminums such as tricyclohexylaluminum and the like; triarylaluminums such as triphenylaluminum, tritolylaluminum and the like; trialkenylaluminums such as triisoprenylaluminum and the like; alkylaluminum dialkoxides such as isobutylaluminum dimethoxide, isobutylaluminum diethoxide, isobutylaluminum diisopropoxide and the like; dialkylaluminum alkoxides such as diethylaluminum ethoxide, dibutylaluminum butoxide and the like; alkylaluminum sesquialkoxides such as ethylaluminum sesquibutoxide, butylaluminum sesquibutoxide and the like; alkylaluminums whose alkyls are partially replaced with aryloxy group such as methylaluminum bis(2,6-di-tert-butyl-4-methylphenoxide), ethylaluminum bis(2,6-di-tert-butyl-4-methylphenoxide) and the like; partially alkoxylated alkylaluminums which have a mean composition in which r in the general formula representing the organoaluminum compound of the fore-mentioned ① is 2.5; etc.

Specific examples of the organoaluminum compound of the fore-mentioned ② include alkylaluminum sesquihalides such as ethylaluminum sesquichloride, butylaluminum sesquichloride, ethylaluminum sesquibromide and the like; dialkylaluminum halides such as dimethylaluminum chloride, diethylaluminum chloride, dipropylaluminum chloride, diisobutylaluminum chloride, dihexylaluminum chloride, dibutylaluminum bromide and the like; alkylaluminum dihalides such as methylaluminum dichloride, ethylaluminum dichloride, propylaluminum dichloride, isobutylaluminum dichloride, hexylaluminum dichloride, octylaluminum dichloride, butylaluminum dibromide and the like; etc.

Specific examples of the organoaluminum compound of the fore-mentioned ③ include dialkylaluminum hydrides such as diethylaluminum hydride, dibutylaluminum hydride, diisobutylaluminum hydride and the like; alkylaluminum dihydrides such as ethylaluminum dihydride, propylaluminum dihydride and the like; alkylaluminums whose alkyl is partially substituted with hydrogen.

Specific examples of the organoaluminum compound of the fore-mentioned ④ include alkylaluminums which are partially alkoxylated and halogenated, etc.

The fore-mentioned organoaluminum compound (A2) is an organoaluminum compound represented by the general formula; $M^1AlR_4$. Herein, $M^1$ represents an alkaline metal atom. The alkaline metal atom is preferably a lithium atom, a sodium atom or a potassium atom, and preferably a lithium atom in particular. The organoaluminum compound (A2) is preferably $LiAl(C_2H_5)_4$ or $LiAl(C_7H_{15})_4$ in particular.

As specific examples of R in a cyclic aluminoxane (A3) having the general formula; $\{-Al(R)-O-\}_j$ and a linear aluminoxane (A4) having the general formula; $R\{-Al(R)-O-\}_kAlR_2$, can be exemplified alkyl groups such as a methyl group, an ethyl group, a n-propyl group, an isopropyl group, a n-butyl group, an isobutyl group, a n-pentyl group, a neopenyl group and the like. "j" is an integer of 2 or more and "k" is an integer of 1 or more. R is preferably a methyl group or an isobutyl group, j is 2 to 40, and k is 1 to 40.

The above-mentioned aluminoxanes are prepared by various methods. The procedure is not particularly restricted, and they may be prepared according to well-known methods. For example, they are prepared by contacting a solution of a trialkylaluminum (for example, trimethylalumnum and the like) in a suitable organic solvent (aromatic hydrocarbon; e.g. benzene, aliphatic hydrocarbon; e.g. hexane; and the like with water. Further, a method for preparing the aluminoxanes by contacting trialkylaluminum (e.g. trimethylaluminum) with a metal salt containing water of crystallization (e.g. cupric sulfate hydrate) can be exemplified. It is considered that the aluminoxanes thus obtained are usually a mixture of (A3) and (A4).

The organoaluminum compound used in the present invention is preferably the above-mentioned organoaluminum compound (A1), further preferably the above-mentioned organoaluminum compound ①, preferably a trialkylaluminum in particular among them, and most preferably trimethylaluminum, triethylaluminum, triisobutylaluminum, tri-n-hexylaluminum or tri-n-octylaluminum.

(B) Boron Compound

As the boron compound (B) used in the present invention, at least one compound selected from the group consisting of boron compounds (B1) represented by the general formula $BQ^1Q^2Q^3$, boron compounds (B2) represented by the general formula $G^+(BQ^1Q^2Q^3Q^4)^-$ and boron compounds (B3) represented by the general formula $(L-H)^+(BQ^1Q^2Q^3Q^4)^-$ can be used.

In the boron compound (B1) represented by the general formula $BQ^1Q^2Q^3$, B represents a boron atom in the trivalent state; $Q^1$ to $Q^3$ are respectively a halogen atom, a hydrocarbon group, a halogenated hydrocarbon group, a substituted silyl group, an alkoxy group or a di-substituted amino group and they may be the same or different. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or a di-substituted amino group having 2 to 20 carbon atoms, and each of more preferable $Q^1$ to $Q^3$ is a halogen atom, a hydrocarbon group having 1 to 20 carbon atoms or a halogenated hydrocarbon group having 1 to 20 carbon atoms. Each of the more preferable $Q^1$ to $Q^3$ is a fluorinated hydrocarbon group having 1 to 20 carbon atoms which contains at least one fluorine atom, and in particular, each of $Q^1$ to $Q^3$ is preferably a fluorinated aryl group having 6 to 20 carbon atoms which contains at least one fluorine atom.

Specific examples of the compound (B1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl) borane and the like, and tris (pentafluorophenyl)borane is most preferable.

In the boron compound (B2) represented by the general formula G⁺(BQ¹Q²Q³Q⁴)⁻, G⁺ is an inorganic or organic cation; B is a boron atom in the trivalent -state; and Q¹ to Q⁴ are the same as defined in Q¹ to Q³ in the above-mentioned (B1).

Specific examples of G⁺ as the inorganic cation in the compound represented by the general formula G⁺(BQ¹Q²Q³Q⁴)⁻ include a ferrocenium cation, an alkyl-substituted ferrocenium cation, a silver cation and the like, and the G⁺ as the organic cation includes a triphenylmethyl cation and the like. G⁺ is preferably a carbenium cation, and a triphenylmethyl cation is particularly preferred. As the (BQ¹Q²Q³Q⁴)⁻, tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate and the like are mentioned.

These specific combinations include lithium tetrakis(3,5-bistrifluoromethylphenyl)borate, sodium tetrakis(3,5-bistrifluoromethylphenyl)borate, potassium tetrakis(3,5-bistrifluoromethylphenyl)borate, silver tetrakis(pentafluorophenyl)borate, ferrocenium tetrakis(pentafluorophenyl)borate, 1,1'-dimethylferrocenium tetrakis(pentafluorophenyl) borate, tetrabutylphsphonium tetrakis(pentafluorophenyl)borate, tetraphenylphsphonium tetrakis(pentafluorophenyl)borate, tetramethylammonium tetrakis(pentafluorophenyl)borate, trimethylsulfonium tetrakis(pentafluorophenyl)borate, diphenyliodonium tetrakis(pentafluorophenyl)borate, triphenylcarbenium tetrakis(pentafluorophenyl)borate, triphenylcarbenium tetrakis(3,5-bistrifluoromethylphenyl)borate and the like, and triphenylcarbeniumtetrakis(pentafluorophenyl)borate is most preferable.

Further, in the boron compound (B3) represented by the formula (L–H)⁺(BQ¹Q²Q³Q⁴)⁻, L is a neutral Lewis base; (L—H)⁺ is a Brφnsted acid; B is a boron atom in the trivalent state; and Q¹ to Q⁴ are the same as Q¹ to Q³ in the above-mentioned Lewis acid (B1).

Specific examples of (L—H)⁺ as the Brφnsted acid in the compound represented by the formula (L—H)⁺(BQ¹Q²Q³Q⁴)⁻ include a trialkyl-substituted ammonium, an N,N-dialkylanilinium, a dialkylammonium, a triarylphosphonium and the like, and examples of (BQ¹Q²Q³Q⁴)⁻ include those as previously described.

These specific combinations include triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, tri(dimethylphenyl)phosphonium tetrakis(pentafluorophenyl)borate and the like, and tri(n-butyl)ammonium tetrakis(pentafluorophenyl)borate or N,N-dimethylanilinum tetrakis(pentafluorophenyl)borate is most preferable.

As the boron compound used in the present invention, the boron compound (B2) or (B3) is preferable, and triphenylcarbeniumtetrakis(pentafluorophenyl)borate, tri(n-butyl)ammonium tetrakis(pentafluorophenyl) borate or N,N-dimethylanilinum tetrakis (pentafluorophenyl)borate is most preferable.

(C) Solid Inorganic Compound

When the solid inorganic compound is used in the present invention, the solid inorganic compound is an inorganic compound which is solid at normal temperature under normal pressure, and a Brφnsted acid salt of an atom selected from the group consisting of metals of the Groups I to XVI of the Periodic Table of the Elements and silicon, or a layered silicate compound is preferably used. The Brφnsted acid salt preferably include halides of the metals, and oxides of the metals and silicon. The bedded silicate compounds preferably include metal silicate compounds, and more preferably clay minerals. They are illustrated in detail below.

Specific examples of the metal selected from the Groups I to XVI of the Periodic Table of the Elements, include lithium, beryllium, sodium, magnesium, aluminum, potassium, calcium, scandium, titanium, vanadium, chromium, manganese, iron, cobalt, nickel, copper, zinc, gallium, germanium, rubidium, strontium, yttrium, zirconium, niobium, molybdenum, ruthenium, rhodium, palladium, silver, cadmium, indium, tin, antimony, cesium, barium, hafnium, lanthanum, tantalum, tungsten, rhenium, osmium, iridium, platinum, gold, mercury, thallium, lead, bismuth, cerium, praseodymium, neodymium, samarium, europium, gadolinium, terbium, dysprosium, holmium, erbium, thulium, ytterbium, lutetium, thorium, and the like, and sodium, magnesium, manganese, iron, cobalt or nickel is preferable.

Further, the fore-mentioned Brφnsted acid includes hydrofluoric acid, hydrochloric acid, hydrobromic acid, hydroiodic acid, water and the like.

The metal halide compound is a halide of a metal atom represented by the general formula (1) described below:

$$M^2_m X^2_n \qquad (1)$$

(wherein $M^2$ represents a metal atom selected from the Groups I to XVI, preferably the Groups I to III and the Groups VI to XVI of the Periodic Table of the Elements and $X^2$ represents a halogen atom. "m" represents a numeral of 1 or more, and "n" represents a product of a valence number of the metal atom and "m".)

Specific examples of $M^2$ are atoms of the metals as described above.

$X^2$ in the above-mentioned general formula (1) represents a halogen atom, and specific examples thereof include a fluorine atom, chlorine atom, bromine atom, iodine atom or the like. A chlorine atom, bromine atom or iodine atom is preferable.

Specific examples of the metal halide represented by the above-mentioned general formula (1) include metal fluorides such as zinc(II) fluoride, aluminum fluoride, antimony (III) fluoride, antimony(V) fluoride, yttrium fluoride, iridium (I) fluoride, iridium(II) fluoride, iridium(III) fluoride, iridium(IV) fluoride, titanium(III) fluoride, iridium(V) fluoride, iridium(VI) fluoride, indium(III) fluoride, osmium (IV) fluoride, osmium(V) fluoride, osmium(VI) fluoride, cadmium(II) fluoride, gadolinium(III) fluoride, potassium fluoride, gallium(III) fluoride, calcium fluoride, gold(III) fluoride, silver(I) fluoride, silver(II) fluoride, chromium(II) fluoride, chromium(III) fluoride, chromium(IV) fluoride, chromium(V) fluoride, chromium(VI) fluoride, cobalt(II) fluoride, cobalt(III) fluoride, samarium(II) fluoride, samarium(III) fluoride, mercury(I) fluoride, mercury(II) fluoride, scandium fluoride, tin(II) fluoride, tin(IV) fluoride, strontium fluoride, cesium fluoride, cerium(III) fluoride, cerium (IV) fluoride, thallium(I) fluoride, thallium(III) fluoride, tungsten(IV) fluoride, tungsten(V) fluoride, tungsten(VI) fluoride, thulium(III) fluoride, technetium(V)

fluoride, technetium(VI) fluoride, iron(II) fluoride, iron(III) fluoride, diiron pentafluoride, copper(I) fluoride, copper(II) fluoride, thorium(IV) fluoride, sodium fluoride, lead(II) fluoride, lead(IV) fluoride, nickel(II) fluoride, neptunium (III) fluoride, neptunium(IV) fluoride, platinum(IV) fluoride, platinum(V) fluoride, platinum(VI) fluoride, palladium(II) fluoride, palladium(IV) fluoride, barium fluoride, bismuth(III) fluoride, beryllium fluoride, holmium (III) fluoride, magnesium fluoride, manganese(II) fluoride, manganese(III) fluoride, manganese(IV) fluoride, molybdenum(II) fluoride, molybdenum(III) fluoride, molybdenum(IV) fluoride, europium(II) fluoride, europium (III) fluoride, lanthanum fluoride, lithium fluoride, ruthenium(II) fluoride, ruthenium(III) fluoride, rubidium fluoride, rhenium (IV), rhenium(V) fluoride, rhenium(VI) fluoride, rhenium(VII) fluoride, rhodium(III) fluoride, rhodium(IV) fluoride, rhodium(V) fluoride, rhodium(VI) fluoride and the like; metal chlorides such as zinc(I) chloride, zinc(II) chloride, aluminum chloride, antimony (III) chloride, antimony(IV) chloride, yttrium(III) chloride, iridium(I) chloride, iridium(II) chloride, iridium(III) chloride, iridium(IV), indium(I) chloride, indium(II) chloride, indium(III) chloride, osmium(III) chloride, osmium(IV) chloride, osmium(V) chloride, cadmium(II) chloride, potassium chloride, gallium(I) chloride, gallium (II) chloride, gallium(III) chloride, calcium chloride, gold(I) chloride, gold(III) chloride, gold(II) dichloride, silver chloride, titanium(III) chloride, chromium(II) chloride, chromium(III) chloride, chromium(IV) chloride, cobalt(II) chloride, mercury(I) chloride, mercury(II) chloride, scandium chloride, tin(II) chloride, tin(IV) chloride, strontium chloride, cerium(III) chloride, cerium(IV) chloride, thallium (I) chloride, thallium(III) chloride, thallium(II) chloride, thallium(III) trichloride, tungsten(II) chloride, tungsten(III) chloride, tungsten(IV) chloride, tungsten(V) chloride, tungsten(VI) chloride, iron(II) chloride, iron(III) chloride, copper(I) chloride, copper(II) chloride, thorium(IV) chloride, sodium chloride, lead(II) chloride, lead(IV) chloride, nickel(II) chloride, neodymium(II) chloride, neodymium(III) chloride, platinum(II) chloride, platinum (IV) chloride, platinum trichloride, palladium(II) chloride, bismuth(III) chloride, praseodymium(III) chloride, plutonium(IV) chloride, berylium chloride, magnesium chloride, manganese(II) chloride, molybdenum(II) chloride, molybdenum(III) chloride, molybdenum(IV) chloride, molybdenum chloride (V), europium(II) chloride, europium (III) chloride, lanthanum chloride, lithium chloride, ruthenium(III) chloride, rubidium chloride, rhenium(III) chloride, rhenium(IV) chloride, rhenium(V) chloride, rhenium(VI) chloride, rhodium(I) chloride, rhodium(II) chloride, rhodium(III) chloride and the like; metal bromides such as zinc(I) bromide, zinc(II) bromide, aluminum bromide, antimony(III) bromide, antimony(IV) bromide, yttrium bromide, iridium(I) bromide, iridium(II) bromide, iridium(III) bromide, iridium(IV) bromide, indium(I) bromide, indium dichloride, indium(III) bromide, osmium (III) bromide, osmium(IV) bromide, cadmium(II) bromide, potassium bromide, gallium(I) bromide, gallium dibromide, gallium(III) bromide, calcium bromide, gold(I) bromide, gold(III) bromide, silver bromide, chromium(II) bromide, chromium(III) bromide, mercury(I) bromide, mercury(II) bromide, scandium bromide, titanium(III) bromide, tin(II) bromide, tin(IV) bromide, strontium bromide, cesium bromide, cerium(III) bromide, thallium(I) bromide, thallium (III) bromide, tungsten(II) bromide, tungsten(III) bromide, tungsten(IV) bromide, tungsten(V) bromide, tungsten(VI) bromide, iron(II) bromide, iron(III) bromide, triiron octabromide, copper(I) bromide, copper(II) bromide, thorium(IV) bromide, sodium bromide, nickel(II) bromide, platinum(II) bromide, platinum(IV) bromide, platinum tribromide, palladium(II) bromide, barium bromide, bismuth bromide, berylium bromide, magnesium bromide, manganese(II) bromide, molybdenum(II) bromide, molybdenum(III) bromide, molybdenum(IV) bromide, europium(II) bromide, europium(III) bromide, lanthanum bromide, lithium bromide, ruthenium(II) bromide, rubidium bromide, rhenium(III) bromide, rhenium(IV) bromide, rhenium(V) bromide, rhodium(II) bromide, rhodium(III) bromide and the like; metal iodides such as zinc(II) iodide, aluminum iodide, diantimony tetraiodide, antimony(III) iodide, yttrium iodide, iridium(I) iodide, iridium(II) iodide, iridium(III) iodide, iridium(IV) iodide, indium(I) iodide, indium(III) iodide, osmium(I) iodide, osmium(II) iodide, osmium(III) iodide, cadmium iodide, potassium iodide, gallium(I) iodide, gallium(III) iodide, calcium iodide, gold (I) iodide, gold(III) iodide, silver iodide, titanium(III) iodide, chromium(II) iodide, chromium(III) iodide, cobalt(I) iodide, cobalt(III) iodide, mercury(I) iodide, mercury(II) iodide, scandium iodide, tin(II) iodide, tin(IV) iodide, strontium iodide, cesium iodide, cerium(II) iodide, cerium(III) iodide, thallium(I) iodide, thallium(III) iodide, tungsten(II) iodide, tungsten(III) iodide, tungsten(IV) iodide, tungsten (V) iodide, tungsten(VI) iodide, iron(II) iodide, iron(III) iodide, triiron octaiodide, copper(I) iodide, copper(II) iodide, thorium(IV) iodide, sodium iodide, lead(II) iodide, nickel(II) iodide, neptunium(III) iodide, neptunium(IV) iodide, platinum(II) iodide, platinum(IV) iodide, platinum triiodide, palladium(II) iodide, barium iodide, bismuth(III) iodide, plutonium(III) iodide, beryllium iodide, magnesium iodide, manganese(II) iodide, molybdenum(III) iodide, molybdenum(IV) iodide, europium(II) iodide, europium(III) iodide, lanthanum iodide; lithium iodide, ruthenium(II) iodide, ruthenium(III) iodide, rubidium iodide, rhenium(III) iodide, rhenium(IV) iodide, rhenium(V) iodide, rhodium(II) iodide, rhodium(III) iodide and the like.

The metal halide is preferably sodium chloride, sodium iodide, magnesium chloride, manganese(II) chloride, iron (II) chloride or nickel(II) bromide.

As the solid inorganic compound, the inorganic oxide is more preferable. The inorganic oxide include oxides of metals of the Group I to the Group XVI of the Periodic Table of the Elements and silicon, and include single oxides and compound oxides thereof.

Specific examples of atoms of metals of the Group I to the Group XVI include atoms of metals as previously described.

Specific examples of the inorganic oxide include zinc oxide, aluminum oxide, antimony(III) oxide, diantimony tetraoxide, antimony(V) oxide, ytterbium(II) oxide, ytterbium(III) oxide, yttrium oxide, yttrium aluminum oxide, yttrium iron oxide, iridium(III) oxide, iridium(IV) oxide, indium(I) oxide, indium (II) oxide, indium(III) oxide, erbium(III) oxide, osmium(IV) oxide, osmium(VIII) oxide, cadmium(II) oxide, gadolinium(III) oxide, potassium oxide, gallium(I) oxide, gallium(III) oxide, calcium oxide, gold oxide, gold(III) oxide, silver(I) oxide, silver(I) oxide, silver (III) oxide, trisilver monooxide, chromium(II) oxide, chromium(III) oxide, chromium(IV) oxide, chromium(V) oxide, chromium(VI) oxide, cobalt(II) oxide, cobalt(III) oxide, cobalt(IV) oxide, tricobalt tetraoxide, cobalt(III) oxide, cobalt(II) oxide, samarium(III) oxide, zirconium(II) oxide, zirconium(IV) oxide, mercury(I) oxide, mercury(II) oxide, scandiumoxide, tin(II) oxide, tin(IV) oxide, strontium oxide, cesium oxide, cerium(III) oxide, cerium(IV) oxide, thallium(I) oxide, thallium(III) oxide, tetrathallium trioxide, tungsten(IV) oxide, tungsten(VI) oxide, tantalum(II) oxide, tantalum(IV) oxide, tantalum(V) oxide, titanium(II) oxide, titanium(III) oxide, titanium(IV) oxide, iron(II) oxide, iron (III) oxide, triiron tetraoxide, iron(IV) oxide, terbium(III) oxide, terbium(IV) oxide, copper(I) oxide, copper(II) oxide, thorium(IV) oxide, sodium oxide, lead(II) oxide, lead(IV) oxide, trilead tetraoxide, dilead trioxide, niobium(II) oxide, niobium(IV) oxide, niobium(V) oxide, nickel(II) oxide, neodymium(III) oxide, platinum(II) oxide, platinum(IV) oxide, triplatinum tetraoxide, vanadium(II) oxide, vanadium (III) oxide, vanadium(IV) oxide, vanadium(V) oxide, hafnium(IV) oxide, palladium(II) oxide, palladium(IV) oxide, dipalladium trioxide, barium oxide, bismuth(III) oxide, bismuth(IV) oxide, bismuth(V) oxide, arsenic oxide, praseodymium(III) oxide, praseodymium(IV) oxide, beryllium oxide, boron oxide, holmium(III) oxide, magnesium oxide, manganese(II) oxide, manganese(III) oxide, manganese(IV) oxide, manganese(VI) oxide, trimanganese tetraoxide, pentamanganese octaoxide, barium manganese (IV) oxide, molybdenum(II) oxide, molybdenum(III) oxide, molybdenum(IV) oxide, molybdenum(V) oxide, molybdenum(VI) oxide, europium(II) oxide, europium(III) oxide, trieuropium tetraoxide, lanthanum oxide, lithium oxide, lutetium(III) oxide, ruthenium(IV) oxide, ruthenium (VIII) oxide, rubidium oxide, rhenium(III) oxide, rhenium (IV) oxide, rhenium(VI) oxide, rhenium(VII) oxide, rhodium(III) oxide, rhodium(IV) oxide, aluminum potassium dioxide, iron potassium dioxide, silica, germanium dioxide, selenium dioxide, potassium thallium(III) dioxide, lithium thallium(III) dioxide, tellurium dioxide, aluminum sodium dioxide, indium(III) sodium dioxide, iron(III) sodium dioxide, lead(II) dipotassium dioxide, lead(II) disodium dioxide, aluminum lithium dioxide, indium(III) lithium dioxide, gallium(III) lithium dioxide, iron(III) lithium dioxide, gallium(III) indium(III) trioxide, niobium (V) potassium trioxide, antimony(V) silver trioxide, indium (III) trilithium trioxide, calcium tin(IV) trioxide, tin(IV) dipotassium trioxide, dialuminum calcium(II) tetraoxide, dialuminum cobalt(II) tetraoxide, bismuth(IV) sodium tetraoxide, dicalcium tin(IV) tetraoxide, dialuminum strontium tetraoxide, diindium(III) strontium tetraoxide, tetrasodium titanium(IV) tetraoxide, iron(II) titanium(IV) tetraoxide, dibarium titanium(IV) tetraoxide, dialuminum iron tetraoxide, dibismuth(III) copper(II) tetraoxide, dicalcium lead(IV) tetraoxide, diiron(III) lead(II) tetraoxide, dibarium lead(IV) tetraoxide, calcium gallium(III) tetraoxide, barium gallium(III) tetraoxide, barium iron(III) tetraoxide, dialuminum barium tetraoxide, dialuminum beryllium tetraoxide, dialuminum magnesium tetraoxide, digallium(III) magnesium tetraoxide, diiron(II) magnesium tetraoxide, diiron(II) titanium(IV) pentaoxide, diselenium pentaoxide, dipotassium dititanium(IV) pentaoxide, ditellurium pentaoxide, diarsine pentaoxide, octalithium lead(IV) hexaoxide, potassium octaborate, sodium octaborate.

The solid metal oxide used in the present invention is preferably magnesium oxide, aluminum oxide, silica, iron oxide, titanium oxide, zirconium oxide and manganese oxide, in particular.

The inorganic oxide can be also used as a compound oxide or mixture containing the inorganic oxide. Further, those having a hydroxyl group on the surface of the inorganic solid can be also used.

The compound oxide or mixture includes natural or synthetic zeolite, silica-manganese oxide, silica-aluminum oxide, silica-titanium oxide, silica-vanadium oxide, silica-titanium oxide-magnesium oxide and the like.

As the solid inorganic compound used in the present invention, a layered silicate compound can be also used. The layered silicate compound becomes a layered structure crystal in which tetrahedrals of $SiO_4$ are usually linked at three peaks to form two-dimensional sheet-like structure, and other ions (ions such as aluminum, manganese, iron or the like) are piled by combining with the structure. It is usually so-called clay minerals which belong to phyllosilicates.

Specific examples of the layered silicate compound include kaolin minerals such as kaolinite, nacrite, dickite, metahalloysite, halloysite and the like; serpentine minerals such as antigorite, chrysotile, amesite, cronstedtite, chamosite and the like; smectites such as montmorillonite, beidellite, nontronite, saponite, hectorite and the like; mica clay minerals such as muscovite, paragonite, sericite, celadonite, glauconite, phlogopite, fluorophlogopite, biotite, lepidolite and the like; pyrophyllite, talc; vermiculite; chlorites such as pennine, cookeite, sudoite and the like; corrensite; tosudite and the like. These may be natural or synthesized minerals. Among these, smectites, mica clay minerals, talc are more preferable.

The layered silicate compound used in the present invention may be treated with chemical treatment. As the chemical treatment, a surface treatment of removing impurities adhered on the surface, and a treatment of introducing a bulky guest compound between layers and enlarging intervals of layers can be also conducted. For example, a lipophilic treatment may be also carried out so as to be easily dispersed (or swelled) in an organic solvent such as an aliphatic hydrocarbon (e.g. hexane, heptane), or an aromatic hydrocarbon (e.g. toluene, xylene), etc. The lipophilic treatment means usually a treatment in which an exchanging cation which exists between the layers of the lamellar silicate compound is ion-exchanged by an organic cation or the like. As the organic cation, for example, an organic ammonium ion, an organic complex cation and the like are mentioned, and among them, a quaternary ammonium ion is often used in particular.

The solid inorganic compound used in the present invention may be used as it is, and treatments such as milling by a ball mill, an agate mortar or the like, sieving and the like can be also conducted. Further, it may be used alone, or in combination of two or more.

When the catalyst for polymerization of the present invention is used, the amount of the organoaluminum compound (A) used can be selected from a wide range in which the concentration of the organoaluminum compound (A) in the polymerization system is usually $10^{-6}$ to 10 mol/l. A range of from $10^{-5}$ to 1 mol/l is preferable.

The amount of the boron compound (B) is used at an amount in which a molar ratio of the organoaluminum compound (A) to the boron compound (B) [(A)/(B)] is usually from 0.1 to 10000 and preferably from 0.5 to 5000.

The amount of the solid inorganic compound (C) used can be selected at a wide range in which the concentration of the solid inorganic compound (C) in the polymerization system is usually 1000 g/l or less, and preferably from 0.001 mg/l to 1000 g/l. The preferable range is from 0.01 mg/l to 100 g/l.

As the method of supplying the respective components in a polymerization vessel, for example, they are supplied in an inert gas such as nitrogen, argon or the like under a moisture free condition. The catalyst components (A), (B) and (C) may be separately fed, or may be fed after previously contacting.

The polymerization is usually carried out at a temperature of from −80° C. to 300° C., preferably from −40° C. to 280° C., and more preferably from 20° C. to 250° C.

The polymerization pressure is not particularly limited, and the pressure range is preferably from normal pressure to about 150 atm. from industrial and economical viewpoints. In general, the polymerization time is appropriately determined depending on the kind of a desired polymer and a reaction apparatus, and the range is usually from 1 minute to 40 hours.

Either of a continuous polymerization process and a batch-wise polymerization process can be adopted. Further, a slurry polymerization or a solvent polymerization in which a hydrocarbon solvent such as propane, pentane, hexane, heptane, octane, toluene or xylene, or a halogenated aromatic hydrocarbon solvent such as chlorobenzene or o-dichlorobenzene is used, a liquid phase polymerization without using a solvent, or a gas phase polymerization can be conducted.

Moreover, in the present invention, an electron donor compound usually used as a third component in a Zieglar-Natta catalyst system may be added In the present invention, the addition polymer is produced by polymerizing an addition-polymerizable monomer in the presence of the above-mentioned catalyst for addition polymerization, and preferably by homopolymerizing an addition-polymerizable monomer, for example, an olefin, or by copolymerizing an olefin with another olefin and/or an addition-polymerizable unsaturated compound other than the olefins.

Addition-polymerizable monomers which can be applied to the polymerization, olefins, vinyl esters, ethylenically unsaturated carboxylic acids or alkyl esters thereof, alkenyl aromatic hydrocarbon compounds and the like are mentioned, and olefins or monomers mainly containing olefins are preferable.

As the olefins, olefins having 2 to 20 carbon atoms, in particular, ethylene, α-olefins having 3 to 20 carbon atoms, diolefins having 4 to 20 carbon atoms and the like can be used, and 2 or more of monomers can be also used at the same time. Specific examples of the olefins include linear chain olefins such as ethylene, propylene, 1-butene, 1-pentene, 1-hexene, 1-heptene, 1-octene, 1-nonene, 1-decene and the like, branched olefins such as 3-methyl-1-butene, 3-methyl-1-pentene, 4-methyl-1-pentene and the like, vinylcyclohexene and the like, and the present invention should not be limited to the above-mentioned compounds.

Specific examples of the vinyl esters include vinyl acetate, vinyl propionate, vinyl benzoate and the like.

As the ethylenically unsaturated carboxylic acids or alkyl esters thereof, acrylate compounds and methacrylate compounds are preferable. Specific examples of the acrylate compounds include methyl acrylate, compounds in which methyl of methyl acrylate is replaced with ethyl, n-propyl, isopropyl, n-butyl, isobutyl or tert-butyl, or the like. Further, specific examples of the methacrylate compounds include methyl methacrylate, compounds in which methyl of methyl methacrylate is replaced with ethyl, n-propyl, isopropyl, n-butyl, isobutyl or tert-butyl, and the like.

As the alkenyl aromatic hydrocarbon compounds, an alkenyl compound having an aromatic hydrocarbon group having 6 to 25 carbon atoms is preferable. Specific examples of the aromatic hydrocarbon group having 6 to 25 carbon atoms include a phenyl group, a tolyl group, a xylyl group, a tert-butylphenyl group, a vinylphenyl group, a naphthyl group, a phenanthryl group, an anthracenyl group and the like. A phenyl group, a tolyl group, a xylyl group, a tert-butylphenyl group, a vinyl phenyl group and a naphthyl group are preferable.

Specific examples of the alkenyl aromatic hydrocarbon include alkenylbenzenes such as styrene, 2-phenylpropylene, 2-phenylbutene, and the like; alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, p-sec-butylstyrene and the like; vinylnaphthalenes such as 1-vinylnaphthalene; divinylbenzene such as p-divinylbenzene and the like, etc.

The catalyst for addition polymerization of the present invention is suitable for production of an olefin polymer. The olefin polymer produced is preferably a copolymer of ethylene with an α-olefin (among them, a linear low density polyethylene (LLDPE) is preferable) in particular, and specific examples of the combination of monomers constituting the copolymer include ethylene and propylene, ethylene and 1-butene, ethylene and 1-hexene, ethylene and 1-octene, and the like, but the present invention should not be limited to these combinations.

Further, the above-mentioned catalyst for polymerization is suitable because a stereo regular α-olefin polymer by polymerizing an α-olefin as the monomer can be produced. In particular, it is suitably used in a process for producing an isotactic stereo regular α-olefin polymer.

The tacticity is determined by $^{13}$C-NMR method, and can be shown by the existence ratio of a plural number of successive constitution units. Wherein the isotactic stereo-regular α-olefin polymer is an α-olefin polymer in which an isotactic diad ratio [mm] being two successive constitution units exceeds 0.25. In the production process, the [mm] of an α-olefin polymer produced is preferably is 0.40 or more, and more preferably 0.50 or more.

The α-olefin is already described above. In production of an α-olefin polymer, α-olefin can be also copolymerized with olefins other than the α-olefin and/or an addition-polymerizable unsaturated compound other than the olefins, within a scope in which the purpose of the present invention is not damaged. The α-olefin is preferably copolymerized at a ratio of 50% by mole or more in the copolymerization.

Specific examples of the combination of monomers constituting the copolymer include propylene and 1-butene, propylene and 1-hexene, propylene and 1-octene, 1-butene and 1-hexene, and the like, but the present invention should not be limited to these combinations.

Further, in order to control the molecular weight of the addition polymer obtained, a chain transfer agent such as hydrogen, a silane compound or the like can be also added.

EXAMPLE

The present invention is further illustrated in detail according to Examples below, but the present invention is not limited thereto.

Further, the measurement values of respective items in Examples were measured according to methods described below.

(1) Intrinsic viscosity ([η]: dl/g)

It was measured at 135° C. in a tetralin solution using an Ubbelohde viscometer.

(2) Weight average molecular weight (Mw), number average molecular weight (Mn), and molecular weight distribution (Mw/Mn):

They were determined under the following conditions according to a gel permeation chromatography (GPC). Further, calibration curve was prepared using a standard polystyrene. Molecular weight distribution was evaluated by a ratio (Mw/Mn) of the weight average molecular weight (Mw) to the number average molecular weight (Mn).

Machine: 150 C type, manufactured by Milipore Waters Co., Ltd.

Column: Shodex M/S 80

Measurement temperature: 145° C.

Solvent: O-dichlorobenzene

Sample concentration: 5 mg/8 ml (3-1) Melting point (Tm: ° C.) [Examples 1 to 12]

It was measured using a differential scanning calorimeter (manufactured by Seiko Electronic Co., Ltd., Type: Seiko SSC-5200) according to the conditions below.

Heating: 40° C. to 150° C. (10° C./min.), retaining for 5 minutes.

Cooling: 150° C. to 40° C. (5° C./min.), retaining for 10 minutes.

Measurement: 40° C. to 160° C. (raised at 5° C. /min.)

(3-2) Melting point (Tm: ° C.) [Examples 13 to 15]

It was measured using DSC-VII manufactured by Perkin Elmer Co., Ltd. according to the conditions below.

Heating: 40° C. to 220° C. (5° C./min.), retaining for 5 minutes.

Cooling: 220° C. to 150° C. (300° C./min.), retaining for 1 minute.

Cooling: 150° C. to 50° C. (5° C./min.), retaining for 1 minute.

Measurement: 50° C. to 180° C. (raised at 5° C. /min.)

(4) Content of Comonomer unit in copolymer $^{13}$C-NMR was measured according to the conditions below using AM400 and AC250 manufactured by Bruker Co., Ltd., and the composition was determined according to the calculation method described in "J. C. Randall, J. Macro. Sci.-Rev. Macromol. Chem. Phys., Vol.C29(2&3), pp201 (1989)".

Solvent: O-dichlorobenzene/deuterated benzene=4/1 (volume ratio)

Concentration: 200 mg/3 ml

Temperature: 135° C.

(5) Stereo-regularity $^{13}$C-NMR was measured according to the conditions below using AM400 manufactured by Bruker Co., Ltd., and the stereo-regularity was calculated according to a peak area ratio of a methyl group.

Solvent: O-dichlorobenzene/deuterated benzene=4/1 (volume ratio)

Concentration: 10 mg/0.6 ml

Temperature: 135° C.

The respective compounds used at polymerization in Examples described below are below.

Triisobutylaluminum: commercially available product manufactured by Toso-Akzo Co., Ltd. Triisobutylaluminum was diluted with toluene to be used as a 1M solution.

Triphenylcarbenium tetrakis(pentafluorophenyl) borate: commercially available product manufactured by Toso-Akzo Co., Ltd. Triphenylcarbenium tetrakis (pentafluorophenyl)borate was diluted with toluene to be used as a 0.005M solution.

Manganese(II) chloride (manufactured by Aldrich Co., Ltd., purity=99.999%), iron(II) chloride (manufactured by Kanto Chemicals Co., Ltd., extra pure grade), magnesium chloride (manufactured by Junsei Chemicals Co., Ltd., purity=99.99%), nickel(II) bromide (manufactured by Strem Chemicals Co., Ltd., purity=99%), sodium chloride (manufactured by Kanto Chemicals Co., Ltd., extra pure grade), sodium iodide (manufactured by Aldrich Co., Ltd., purity=99.999%), silica (manufactured by Davison Co., Ltd., SMR49-2903, mean particle diameter=50 μm), montmorillonite (manufactured by Kunimine Industry Co., Ltd., KUNIPIA-F), and synthetic saponite (manufactured by Kunimine Co., Ltd., SMECTON SA) were milled under nitrogen atmosphereusingan agate mortar. iron(II, III) oxides (manufactured by Aldrich Co., Ltd., purity=98%) were used as they were.

EXAMPLE 1

The atmosphere of a 400 ml stirring type autoclave made of stainless had been replaced with argon, 200 ml of purified toluene was charged thereto, and the inside of the autoclave was adjusted at 35° C. Thereto, 1 ml (1 mmol) of triisobutylaluminum and 14 mg of manganese(II) chloride were added. After stirring at 35° C. for 3 minutes, 1 ml (5 μmol) of triphenylcarbenium tetrakis(pentafluorophenyl)borate was added and the mixture was stirred. The molar ratio [Al]/[B] of aluminum atom to boron atom was 200. Ethylene gas of 1.0 MPa was fed and polymerization was carried out at 40° C. for 60 minutes. During the polymerization, ethylene gas was continuously fed so that the pressure in the system is constant. Then, the polymerization was terminated by introducing 10 ml of ethanol under pressure. The unreacted ethylene gas was purged, the content of the autoclave was charged in 400 ml of ethanol into which 20 ml of 3N hydrochloric acid was added, a polymer precipitated was separated by filtration, and drying was carried out at 80° C. for about 4 hours. As a result, 7.0 g of a polyethylene was obtained. The intrinsic viscosity ([η]) of the polyethylene obtained was 1.39 dl/g, weight average molecular weight (Mw) was 75600, and molecular weight distribution (Mw/Mn) was 2.0. Melting point (Tm) was 136° C.

EXAMPLE 2

Polymerization was carried out in the same manner as in Example 1, except that manganese(II) chloride was changed to 9.5 mg of iron(II) chloride. As a result, 2.07 g of a polyethylene was obtained. The weight average molecular weight (Mw) of the polyethylene obtained was 75400, and molecular weight distribution (Mw/Mn) was 1.6. Melting point (Tm) was 136° C.

EXAMPLE 3

Polymerization was carried out in the same manner as in Example 1, except that manganese(II) chloride was changed to 11.7 mg of magnesium chloride. As a result, 5.24 g of a polyethylene was obtained. The weight average molecular weight (Mw) of the polyethylene obtained was 75800, and molecular weight distribution (Mw/Mn) was 1.7. Melting point (Tm) was 136° C.

EXAMPLE 4

Polymerization was carried out in the same manner as in Example 1, except that manganese(II) chloride was changed to 16.1 mg of nickel(II) bromide. As a result, 1.75 g of a polyethylene was obtained. The weight average molecular weight (Mw) of the polyethylene obtained was 78500, and molecular weight distribution (Mw/Mn) was 1.6. Melting point (Tm) was 136° C.

EXAMPLE 5

Polymerization was carried out in the same manner as in Example 1, except that manganese(II) chloride was changed to 11.8 mg of sodium chloride. As a result, 0.48 g of a polyethylene was obtained. The weight average molecular weight (Mw) of the polyethylene obtained was 134000, and molecular weight distribution (Mw/Mn) was 2.6. Melting point (Tm) was 136° C.

EXAMPLE 6

Polymerization was carried out in the same manner as in Example 1, except that manganese(II) chloride was changed to 13.5 mg of sodium iodide. As a result, 0.63 g of a polyethylene was obtained. The weight average molecular weight (Mw) of the polyethylene obtained was 74300, and molecular weight distribution (Mw/Mn) was 1.6. Melting point (Tm) was 136° C.

EXAMPLE 7

The atmosphere of a 400 ml stirring type autoclave made of stainless had been replaced with argon, 200 ml of purified toluene was charged thereto, and the inside of the autoclave was adjusted at 25° C. Thereto, 1 ml (1 mmol) of triisobutylaluminum and 12 mg of silica were added. After stirring at 35° C. for 3 minutes, 1 ml (5 µmol) of triphenylcarbenium tetrakis(pentafluorophenyl)borate was added and the mixture was stirred. The molar ratio [Al]/[B] of aluminum atom to boron atom was 200. After 30 minutes, ethylene gas of 1.0 MPa was fed and polymerization was carried out at 40° C. for 60 minutes. During the polymerization, ethylene gas was continuously fed so that the pressure in the system is constant. Then, the polymerization was terminated by introducing 10 ml of ethanol under pressure. The unreacted ethylene gas was purged, the content of the autoclave was charged in 400 ml of ethanol into which 20 ml of 3N hydrochloric acid was added, a polymer precipitated was separated by filtration, and drying was carried out at 80° C. for about 4 hours. As a result, 8.39 g of a polyethylene was obtained. The intrinsic viscosity ([η]) of the polyethylene obtained was 1.32 dl/g, weight average molecular weight (Mw) was 74900, and molecular weight distribution (Mw/Mn) was 1.9. Melting point (Tm) was 136° C.

EXAMPLE 8

Polymerization was carried out in the same manner as in Example 7, except that 12 mg of silica was changed to 13 mg of iron oxide. As a result, 1.87 g of a polyethylene was obtained. The weight average molecular weight (Mw) of the polyethylene obtained was 82250, and molecular weight distribution (Mw/Mn) was 2.1. Melting point (Tm) was 136° C.

EXAMPLE 9

Polymerization was carried out in the same manner as in Example 7, except that 12 mg of silica was changed to 15 mg of montmorillonite. As a result, 7.75 g of a polyethylene was obtained. The intrinsic viscosity ([η]) of the polyethylene obtained was 1.39 dl/g, weight average molecular weight (Mw) was 74220, and molecular weight distribution (Mw/Mn) was 1.8. Melting point (Tm) was 136° C.

EXAMPLE 10

Polymerization was carried out in the same manner as in Example 7, except that 12 mg of silica was changed to 13.6 mg of synthetic saponite . As a result, 2.69 g of a polyethylene was obtained. The weight average molecular weight (Mw) of the polyethylene obtained was 72750, and molecular weight distribution (Mw/Mn) was 1.8. Melting point (Tm) was 136° C.

EXAMPLE 11

The atmosphere of a 400 ml stirring type autoclave made of stainless had been replaced with argon, 100 ml of purified toluene, 100 ml of 1-hexene and ethylene gas of 1.0 MPa were charged thereto, and the inside of the autoclave was adjusted at 40° C. Thereto, 1 ml (1 mmol) of triisobutylaluminum and 27.5 mg of manganese(II) chloride were added. After stirring at 40° C. for 3 minutes, 3 ml (15 µmol) of triphenylcarbenium tetrakis(pentafluorophenyl)borate was added and the mixture was stirred. The molar ratio [Al]/[B] of aluminum atom to boron atom was 67. Ethylene gas of 1.0 MPa was fed and polymerization was carried out at 40° C. for 60 minutes. During the polymerization, ethylene gas was continuously fed so that the pressure in the system is constant. Then, the polymerization was terminated by introducing 10 ml of ethanol under pressure. The unreacted ethylene gas was purged, the content of the autoclave was charged in 400 ml of ethanol into which 20 ml of 3N hydrochloric acid was added, a polymer precipitated was separated by filtration, and drying was carried out at 80° C. for about 4 hours. As a result, 1.36 g of a copolymer was obtained. The intrinsic viscosity ([η]) of the copolymer obtained was 1.15 dl/g, weight average molecular weight (Mw) was 57400, and molecular weight distribution (Mw/Mn) was 1.7. The content of 1-hexene unit in the copolymer was 11% by mole. Melting point (Tm) was 69° C.

EXAMPLE 12

Polymerization was carried out in the same manner as in Example 11 except that manganese(II) chloride was changed to 33 mg of silica. As a result, 4.10 g of a copolymer was obtained. The intrinsic viscosity ([η]) of the copolymer obtained was 1.05 dl/g, weight average molecular weight (Mw) was 61580, and molecular weight distribution (Mw/Mn) was 1.7. The content of 1-hexene unit in the copolymer was 11% by mole. Melting point (Tm) was 82° C.

Comparative Example 1

The atmosphere of a 400 ml stirring type autoclave made of stainless had been replaced with argon, 200 ml of purified toluene was charged thereto, and the inside of the autoclave was adjusted at 35° C. Thereto, 1 ml (1 mmol) of triisobutylaluminum and 13 mg of manganese(II) chloride were added. Ethylene gas of 1.0 MPa was fed and the system was maintained at 40° C. for 60 minutes. Then, 10 ml of ethanol was charged under pressure. The unreacted ethylene gas was purged, and the content of the autoclave was charged in 400 ml of ethanol into which 20 ml of 3N hydrochloric acid was added. As a result, no polyethylene was obtained.

Comparative Example 2

The atmosphere of a 400 ml stirring type autoclave made of stainless had been replaced with argon, 200 ml of purified toluene was charged thereto, and the inside of the autoclave was adjusted at 35° C. Thereto, 10 mg of manganese(II) chloride and 1 ml (5 µmol) of triphenylcarbenium tetrakis (pentafluorophenyl)borate were added. Ethylene gas of 1.0 MPa was fed and the system was maintained at 40° C. for 60 minutes. Then, 10 ml of ethanol was charged under pressure. The unreacted ethylene gas was purged, and the content of the autoclave was charged in 400 ml of ethanol into which 20 ml of 3N hydrochloric acid was added. As a result, no polyethylene was obtained.

EXAMPLE 13

Under nitrogen atmosphere, 25 mg (0.2 mmol) of manganese(II) chloride, 184 mg of triphenylcarbenium tetrakis(pentafluorophenyl)borate, and 5 ml of purified toluene were charged in a 100 ml autoclave made of stainless. Thereto, 1 ml (1 mmol) of triisobutylaluminum was added, the autoclave was cooled using dry ice, and 40 g of propylene was charged. Then, the mixture was reacted at 35° C. for 3 hours in an oil bath. The unreacted propylene gas was purged, the content of the autoclave was charged in 100 ml of ethanol into which 5 ml of 3N hydrochloric acid was added, a polymer precipitated was separated by filtration, and drying was carried out at 80° C. for about 4 hours. As a result, 53 mg of a polypropylene was obtained. The weight average molecular weight (Mw) of the polypropylene obtained was 541000, and molecular weight distribution (Mw/Mn) was 9.9. Concerning stereo regularity, [mm] was 0.63, [mr] was 0.20, and [rr] was 0.17. Melting point (Tm) was 144° C.

EXAMPLE 14

Polymerization was carried out in the same manner as in Example 13, except that manganese(II) chloride was changed to 19 mg (0.2 mmol) of magnesium chloride. As a result, 68 mg of a polypropylene was obtained. The weight average molecular weight (Mw) of the polypropylene obtained was 964000, and molecular weight distribution (Mw/Mn) was 10.1. Concerning stereo-regularity, [mm] was 0.57, [mr] was 0.23, and [rr] was 0.20. Melting point (Tm) was 147° C.

EXAMPLE 15

Under nitrogen atmosphere, 40 ml of purified toluene, 1 ml (1 mmol) of triisobutylaluminum, 0.20 g of silica, 240 mg (0.26 mmol) of triphenylcarbenium tetrakis (pentafluorophenyl)borate toluene solution (10.6 ml) were charged in a 400 ml autoclave made of stainless. After 30 minutes, 80 g of propylene was charged, and the mixture was reacted at 40° C. for 1 hour. The unreacted propylene gas was purged, the content of the autoclave was charged in 400 ml of ethanol into which 20 ml of 3N hydrochloric acid was added, a polymer precipitated was separated by filtration, and drying was carried out at 80° C. for about 4 hours. As a result, 21.2 g of polypropylene was obtained. The weight average molecular weight (Mw) of polypropylene obtained was 54280, and molecular weight distribution (Mw/Mn) was 1.73. Concerning stereo-regularity, [mm] was 0.930, [mr] was 0.048, and [rr was 0.022. Melting point (Tm) was 142° C.

Comparative Example 3

Polymerization was carried out in the same manner as in Example 13, except that triphenylcarbenium tetrakis (pentafluorophenyl)borate was not added. As a result, a polymer was hardly obtained.

Comparative Example 4

Polymerization was carried out in the same manner as in Example 13, except that manganese chloride was not added. As a result, 31 mg of a polypropylene was obtained. The weight average molecular weight (Mw) of the polypropylene obtained was $1.61 \times 10^6$, and molecular weight distribution (Mw/Mn) was 4.6. Concerning stereo-regularity, [mm] was 0.12, [mr] was 0.39, and [rr] was 0.49. The obtained polymer did not have melting point (Tm).

As described above in detail, according to the present invention, a catalyst for addition polymerization which reveals a high polymerization activity, and an efficient process for producing an olefin polymer are provided. A high polymerization activity can be revealed according to the present invention without using a conventional solid catalyst component (a solid catalyst component in which a titanium atom, a halogen atom and an electron donor are essential components), a transition metal compound such as a metallocene complex or the like which has been considered as essential for revealing a high polymerization activity, and an olefin polymer of higher molecular weight can be produced, therefore the value of the present invention is extremely great.

What is claimed is:

1. A catalyst for addition polymerization obtained by contacting (A), (B) and (C) described below:
   (A) an organoaluminum compound,
   (B) one or more of boron compounds selected from (B1) to (B3) below;
   (B1) a boron compound represented by the general formula $BQ^1Q^2Q^3$,
   (B2) a boron compound represented by the general formula $G^+(BQ^1Q^2Q^3Q^4)^-$, and
   (B3) a boron compound represented by the general formula $(L—H)^+(BQ^1Q^2Q^3Q^4)^-$
   (wherein each of $Q^1$ to $Q^4$ is independently a halogen atom, a hydrocarbon group, a halogenated hydrocarbon group, a heterocyclic group, a substituted silyl group, an alkoxy group, or a di-substituted amino group, and they may be the same or different; $G^+$ is an inorganic, organic or organometallic cation; L is a neutral Lewis base, and $(L—H)^+$ is a Brønsted acid), and
   (C) a solid inorganic compound.

2. The catalyst according to claim 1, wherein the organoaluminum compound is one or more of aluminum compounds selected from (A1) to (A4) below:
   (A1) An organoaluminum compound represented by the general formula; $R_rAl(OR)_oH_pX^1_q$;
   (A2) an organoaluminum compound represented by the general formula; $M^1AlR_4$;
   (A3) a cyclic aluminoxane having a structure represented by the general formula; $\{—Al(R)—O—\}_j$; and
   (A4) an aluminoxane having a structure represented by the general formula; $R\{—Al(R)—O—\}_kAlR_2$
   (wherein each of R's independently represents a hydrocarbon group having 1 to 20 carbon atoms; each of $X^1$'s independently represents a halogen atom; $M^1$ represents an alkaline metal atom; "r" represents a numeral satisfying $0<r\leq3$; "o" represents a numeral satisfying $0\leq o<3$; "p" represents a numeral satisfying $0\leq p<3$; "q" represents a numeral satisfying $0\leq q<3$; r+o+p+q= 3; "j" represents an integer of 2 or more; and "k" represents an integer of 1 or more).

3. The catalyst according to claim 1, wherein the solid inorganic compound (C) is a Brønsted acid salt of an atom selected from the group consisting of metals of the Groups I to XVI of the Periodic Table of the Elements and silicon, or a layered silicate compound.

4. The catalyst according to claim 2, wherein the solid inorganic compound (C) is a Brønsted acid salt of an atom selected from the group consisting of metals of the Groups I to XVI of the Periodic Table of the Elements and silicon, or a layered silicate compound.

5. The catalyst according to claim 3, wherein the Brønsted acid salt is a halide of a metal atom represented by the general formula (1):

$$M^2{}_m X^2{}_n \qquad (1)$$

(wherein $M^2$ represents a metal atom selected from the Groups I to XVI of the Periodic Table of the Elements and $X^2$ represents a halogen atom; "m" represents a numeral of 1 or more, and "n" represents a product of a valence number of the metal atom and "m").

6. The catalyst according to claim 4, wherein the Brønsted acid salt is a halide of a metal atom represented by the general formula (1):

$$M^2{}_m X^2{}_n \tag{1}$$

(wherein $M^2$ represents a metal atom selected from the Groups I to XVI of the Periodic Table of the Elements and $X^2$ represents a halogen atom; "m" represents a numeral of 1 or more, and "n" represents a product of a valence number of the metal atom and "m").

7. The catalyst according to claim 3, wherein the Brønsted acid salt is an inorganic oxide selected from the group consisting of oxides of metals of the Group I to the Group XVI of the Periodic Table of the Elements and silicon.

8. The catalyst according to claim 4, wherein the Brønsted acid salt is an inorganic oxide selected from the group consisting of oxides of metals of the Group I to the Group XVI of the Periodic Table of the Elements and silicon.

9. The catalyst according to claim 3, wherein the layered silicate compound is a clay mineral.

10. The catalyst according to claim 4, wherein the layered silicate compound is a clay mineral.

\* \* \* \* \*